Patented July 28, 1936

2,048,768

UNITED STATES PATENT OFFICE 2,048,768

AROYL CHLORIDE OF THE BENZENE SERIES

Harold William Anderson, Wilmington, Del., assignor to E. I. du Pont de Nemours & Company, Wilmington, Del., a corporation of Delaware No Drawing. Application January 29, 1934, Serial No. 708,910

6 Claims. (Cl. 260—123)

This invention relates to acyl halides, more particularly to acyl chlorides, and a process for the production thereof.

The preparation of organic acyl chlorides by reacting carboxylic acids with phosphorus pentachloride has long been known and is widely described in the literature. This method of producing acyl chlorides, however, is objectionable on account of the difficulties of handling phosphorus pentachloride and of the violence of the reaction.

It has heretofore been proposed to produce acyl chlorides by mixing together the organic acid and phosphorus trichloride and then passing in chlorine gas which apparently reacts first with the phosphorus trichloride to produce phosphorus pentachloride, the latter reacting with the organic acid to convert it into the corresponding acyl chloride. This process is not all that might be desired, particularly in the production of aroyl chlorides, since the phosphorus pentachloride is produced very suddenly and in high concentration. Difficulty is also experienced in introducing the chlorine into the reaction mixture since if it is introduced through a nozzle, solid phosphorus pentachloride forms at the mouth of the nozzle and impedes the progress of the reaction. In order to overcome this, it has been the practice to introduce the chlorine above the surface of the liquid, thereby limiting the reaction zone, decreasing the efficiency of the reaction, and increasing the cost of the product.

It is an object of this invention to provide a new and improved process for the production of acyl chlorides. A further object is the provision of a new and improved process for the production of aroyl chlorides. A still further and more specific object is to provide a new and improved process for the production of nitrobenzoyl chlorides and particularly para-nitrobenzoyl chloride. Other objects will appear hereinafter.

These objects are accomplished according to this invention by carrying out the reaction of chlorine on a mixture of phosphorus trichloride and a carboxylic acid of the benzene series, while having a solvent such as phosphorus oxychloride present throughout the entire chlorination reaction.

The invention will be more fully understood by reference to the following example, in which the parts are by weight:

Example

To 1000 parts of phosphorus oxychloride add 450 parts of dry para-nitrobenzoic acid followed by 400 parts of phosphorus trichloride, and pass in chlorine at about 50° C. with or without agitation, until the reaction is finished as evidenced by no further heat of reaction and complete clarity of the mixture. Then distil off the phosphorus oxychloride, both that used as a solvent and that formed in the reaction. This leaves as a residue para-nitrobenzoyl chloride of excellent quality, suitable for use directly. If desired, however, it may be further purified, as for example, by recrystallization from a suitable solvent such as carbon tetrachloride.

In place of para-nitrobenzoic acid, other benzene carboxylic acids such as, for example, benzoic acid, ortho-chlorobenzoic acid, meta-nitrobenzoic acid, 3-nitro-4-methyl-benzoic acid, 3-nitro-4-methoxy-benzoic acid and 3-nitro-4-chlorobenzoic acid, may be used to produce the corresponding acyl chlorides.

The amount of phosphorus trichloride employed in carrying out the reaction is subject to variation, depending largely upon the results desired. In general, the amount of phosphorus trichloride should preferably be at least equivalent to the carboxyl groups to be converted into the carbonyl chloride. By employing less than the equivalent amounts, mixtures of the carbonyl chloride and carboxylic acid may be prepared in any desired proportions.

The amount of phosphorus oxychloride employed in carrying out the reaction is subject to variation, but should preferably be at least 1.6 to 1.8 mols per mol of phosphorus trichloride. This is an excess of phosphorus oxychloride over that required to dissolve the phosphorus trichloride. With smaller amounts of phosphorus oxychloride, the mass stays very thick for a much longer time at the start of the chlorination and does not chlorinate as well. Phosphorus trichloride may be added to the reaction mixture as the reaction proceeds, thereby minimizing the amount of phosphorus oxychloride initially added, but this is apt to make the reaction very difficult on account of the thick mass slowing up the chlorination. Relatively large amounts of phosphorus oxychloride may be used, if desired, though the cost normally requires the use of as little as convenient to carry out the reaction satisfactorily.

The temperature at which the chlorine is introduced may be varied widely. Generally speaking, any temperature up to the boiling point of phosphorus trichloride (76° C.) may be employed, although in most cases temperatures within the range of 40° C. to 60° C. have given especially desirable results.

The method by which the phosphorus oxychloride is removed from the reaction mixture may be varied widely. It may be distilled off at atmospheric pressure or under diminished pressures. It may be removed by fractional distillation at atmospheric or diminished pressures, or it may be removed by treatment with a solvent with separation of the acyl chloride as a solid (when the acyl chloride is a solid) by crystallization, followed by recovery of the phosphorus oxychloride by distillation of the solvent extract. Any suitable solvent may be used such as, for example, toluene, benzene, carbon tetrachloride, or other solvents which will not react with the acyl chloride or phosphorus compounds present.

The acyl chloride may be purified, if desired, for example, by distillation, preferably under diminished pressures, or by re-crystallization from suitable solvents.

In carrying out the reaction of chlorine on the mixture of phosphorus trichloride and carboxylic acid while having a solvent such as phosphorus oxychloride present during the chlorination, as above described, it has been found that many of the disadvantages of previously described processes are avoided. Chlorine may be introduced into the reaction mixture directly, and the reaction proceeds readily and smoothly. On account of the greater ease of operation, it is possible to operate the process at a lower cost than in the case of previously proposed processes. Furthermore, in many cases, improved yields and products of improved quality are obtained. The improved results are particularly evident in the production of para-nitrobenzoyl chloride.

As many apparently widely different embodiments of this invention may be made without departing from the spirit and scope thereof, it is to be understood that I do not limit myself to the specific embodiments thereof except as defined in the following claims.

I claim:

1. The process of producing an aroyl chloride of the benzene series which comprises reacting with chlorine on a mixture of phosphorus trichloride and a carboxylic acid of the benzene series, in the presence of phosphorus oxychloride, the amount of phosphorus oxychloride always being at least 1.6 mols per mol of phosphorus trichloride.

2. The process of producing an aroyl chloride of the benzene series which comprises reacting chlorine on a mixture of phosphorus trichloride in phosphorus oxychloride solution and a carboxylic acid of the benzene series at a temperature of 40° C. to 60° C., the amount of phosphorus oxychloride always being at least 1.6 mols per mol of phosphorus trichloride.

3. The process of producing a nitrobenzoyl chloride which comprises reacting with chlorine on a mixture of phosphorus trichloride in phosphorus oxychloride solution and a nitrobenzoic acid, the amount of phosphorus oxychloride always being at least 1.6 mols per mol of phosphorus trichloride.

4. The process of producing para-nitrobenzoyl chloride which comprises reacting with chlorine on a mixture of phosphorus trichloride, para-nitrobenzoic acid and phosphorus oxychloride, the amount of phosphorus oxychloride always being at least 1.6 mols per mol of phosphorus trichloride.

5. The process of producing para-nitrobenzoyl chloride which comprises reacting with chlorine on a mixture of phosphorus trichloride in phosphorus oxychloride solution and para-nitrobenzoic acid at a temperature within the range 40° C. to 60° C., the amount of phosphorus oxychloride always being at least 1.6 mols per mol of phosphorus trichloride.

6. The process of producing para-nitrobenzoyl chloride which comprises passing chlorine into a mixture of about 1000 parts of phosphorus oxychloride, about 450 parts of dry para-nitrobenzoic acid and about 400 parts of phosphorus trichloride, while maintaining a temperature of about 50° C.

HAROLD WILLIAM ANDERSON.